(12) United States Patent
Levit-Gurevich

(10) Patent No.: US 11,093,366 B2
(45) Date of Patent: Aug. 17, 2021

(54) GENERATING DIFFERENT TRACES FOR GRAPHICS PROCESSOR CODE

(71) Applicant: Intel Corporation, Santa Clara, CA (US)

(72) Inventor: Konstantin Levit-Gurevich, Kiryat Byalik (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/553,614

(22) Filed: Aug. 28, 2019

(65) Prior Publication Data
US 2020/0012585 A1    Jan. 9, 2020

(51) Int. Cl.
| | |
|---|---|
| *G06F 9/44* | (2018.01) |
| *G06F 11/36* | (2006.01) |
| *G06F 11/34* | (2006.01) |
| *G06T 1/20* | (2006.01) |
| *G06F 9/52* | (2006.01) |
| *G06F 8/41* | (2018.01) |

(52) U.S. Cl.
CPC .......... *G06F 11/3636* (2013.01); *G06F 8/427* (2013.01); *G06F 9/52* (2013.01); *G06F 11/3476* (2013.01); *G06T 1/20* (2013.01)

(58) Field of Classification Search
CPC ........ G06F 11/3636; G06F 8/427; G06F 9/52; G06F 11/3476; G06T 1/20
USPC .................................. 717/128–131
See application file for complete search history.

(56) References Cited

U.S. PATENT DOCUMENTS

| | | | |
|---|---|---|---|
| 10,698,792 B2* | 6/2020 | Nelson | G06F 11/3624 |
| 2015/0355996 A1* | 12/2015 | Smith | G06F 9/461 |
| | | | 717/128 |

* cited by examiner

*Primary Examiner* — Chuck O Kendall
(74) *Attorney, Agent, or Firm* — Kacvinsky Daisak Bluni PLLC

(57) ABSTRACT

Systems, methods, computer program products, and apparatuses to determine a count of trace records to be generated by each block of a plurality of blocks of an instrumented binary code to be executed on a graphics processor, each trace record to comprise a trace record type, the trace record types of a plurality of trace record types, determine a respective execution count for each of the plurality of blocks of the instrumented binary code to be executed on the graphics processor, and determine a respective size of each of a plurality of trace buffers to be allocated in memory based on the determined counts of trace records generated by each block and the execution count for each block, each trace buffer to store trace records of a respective one of the plurality of trace record types.

20 Claims, 11 Drawing Sheets

GENERATING DIFFERENT TRACES FOR GRAPHICS PROCESSOR CODE

CROSS REFERENCE TO RELATED APPLICATION

This application relates to U.S. patent application Ser. No. 16/296,357 filed Mar. 8, 2019, entitled "BINARY INSTRUMENTATION TO TRACE GRAPHICS PROCESSOR CODE." The aforementioned patent application is incorporated herein by reference in its entirety.

BACKGROUND

Dynamic profiling is a useful tool to analyze and tune computer code, as profiling data may be generated while code is executed on a computing system. Some such solutions require capturing traces, such as control-flow traces and/or memory access traces. The complexity of capturing such trace data increases as modern systems, such as graphics processors, implement multiple processing elements that can execute code in parallel.

DETAILED DESCRIPTION

Figure 1:
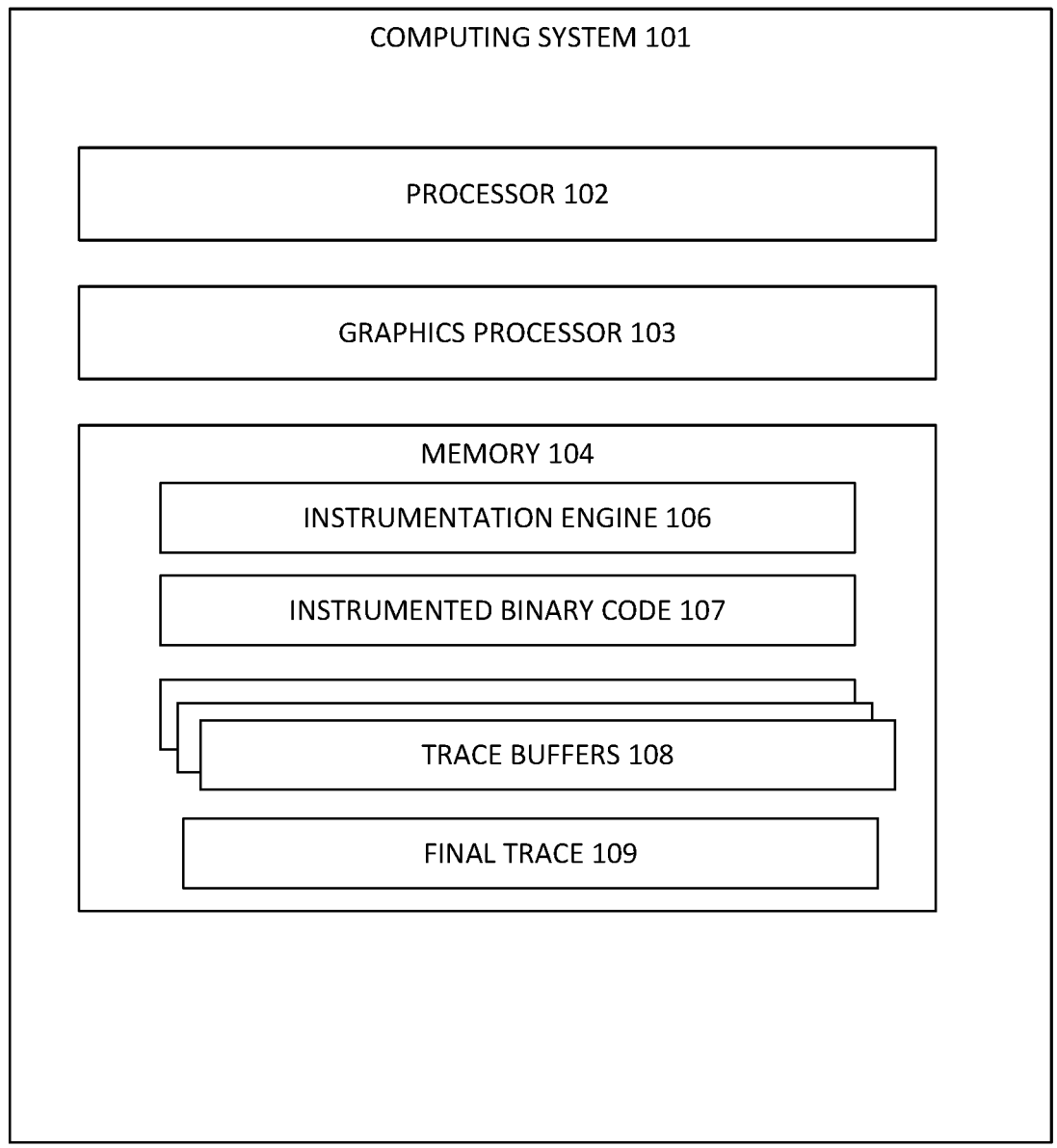
FIG. 1 illustrates an embodiment of a system.

Embodiments disclosed herein provide techniques to dynamically generate multiple traces of different types and/or sizes from binary code executing on a plurality of execution units of one or more graphics processors (GPUs) via instrumentation of the binary code. Generally, embodiments disclosed herein may allocate a trace buffer in a shared memory for each type of trace. Trace data may be collected and stored in the respective buffers during execution of the instrumented binary code on the GPUs. Once execution of the instrumented binary code is complete, embodiments disclosed herein may combine the data stored in each buffer to generate a final trace.

More generally, embodiments disclosed herein may include three processing phases, namely a preprocessing phase, a processing phase, and a postprocessing phase. In the preprocessing phase, embodiments disclosed herein may analyze the binary code to determine one or more basic blocks of the binary code, and how frequently each basic block is executed. Based on the analysis, embodiments disclosed herein may determine, for each trace type, a size of the corresponding trace buffer in the shared memory. During the processing phase, the different trace buffers are allocated in the shared memory and the instrumented binary code is executed by the GPU. Doing so generates trace data in parallel which may be stored in the corresponding trace buffer. In the postprocessing phase, the trace data from each trace buffer is parsed, analyzed, and combined into a final trace based on the order of execution of the instrumented binary code.

Advantageously, embodiments provide efficient techniques to combine multiple traces of different types from one or more executions of the same binary code, even though GPU hardware exhibits highly non-deterministic behavior, as hundreds of execution units and/or hardware threads of the GPU may execute code in parallel. Furthermore, embodiments disclosed herein may be applied to any type of trace generation for any application regardless of the number and/or type of application programming interface (API) implemented by the application. Further still, embodiments disclosed herein do not require synchronization between central processing units (CPUs) and the GPU, as the buffer sizes are predefined and cannot be overflowed. Therefore, the GPU stores minimal information and does not need to halt execution of the binary code. Furthermore, by generating multiple traces in parallel, embodiments disclosed herein do not require multiple execution instances of the binary code, and do not require the complex analysis associated with combining the traces generated by the multiple execution instances to generate a final trace.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an embodiment of a system 100. As shown, the system 100 includes at least one computing system 101. The computing system 101 may be any type of computing system, such as a server, workstation, laptop, mobile device, or virtualized computing system. For example, the computing system 101 be an embedded system such as a deep learning accelerator card, a processor with deep learning acceleration, a neural compute stick, or the like. In some examples, the computing system 101 comprises a System on a Chip (SoC) and, in other embodiments, the computing system 101 includes a printed circuit board or a chip package with two or more discrete components.

As shown, the system 101 includes one or more processors 102, one or more graphics processors 103, and a memory 104 shared between the CPU 102 and the graphics processor 103. The CPU 102 and the graphics processor 103 may each comprise multiple processor cores, where each core may comprise multiple processing threads. The processor 102 may include a general purpose processor, a special purpose processor, a central processor unit, a controller, a micro-controller, etc. The graphics processor 103 may include a parallel processor unit (PPU), a graphics processor unit (GPU), etc. As the memory 104 is shared between the CPU 102 and the graphics processor 103, at least a portion of the memory 104 may be allocated to the CPU 102, while at least a different portion of the memory 104 may be allocated to the graphics processor 103.

As shown, the memory 104 includes an instrumentation engine 106, an instrumented binary code 107, and a plurality of trace buffers 108. Although depicted as being embodied in software, the instrumentation engine 106 may comprise hardware, software, and/or a combination of hardware and software. For example, hardware implementations may include configurable logic such as, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

The instrumented binary code 107 is representative of any type of assembly code that is instrumented to generate trace data that can be stored in the trace buffers 108. For example, the instrumented binary code 107 may comprise GEN ISA instructions, SIMD8 instructions, SIMD16 instructions, etc. In some embodiments, the instrumented binary code 107 includes floating point and/or integer data types. The instrumented binary code 107 may be executed by the graphics processor 103. In some embodiments, when executed by the graphics processor 103, the instrumented binary code 107 may be referred to as a kernel and/or shader code. The graphics processor 103 comprises a plurality of execution units (e.g., symmetric multithreaded processors). Therefore, at least a portion of the instrumented binary code 107 may be executed by one or more of the execution units of the graphics processor 103 in parallel. As such, management of the trace data generated by the instrumented binary code 107 is a complex process.

The instrumentation engine 106 may execute on the processor 102 to instrument the underlying code of the instrumented binary code 107 to generate the instrumented binary code 107. Furthermore, the instrumentation engine 106 may analyze the generated instrumented binary code 107, allocate and initialize one or more trace buffers 108 in the shared memory 104, and combine the data stored in the trace buffers 108 when the instrumented binary code 107 is executed by the graphics processor 103 (e.g., to create a final trace).

Figure 2:
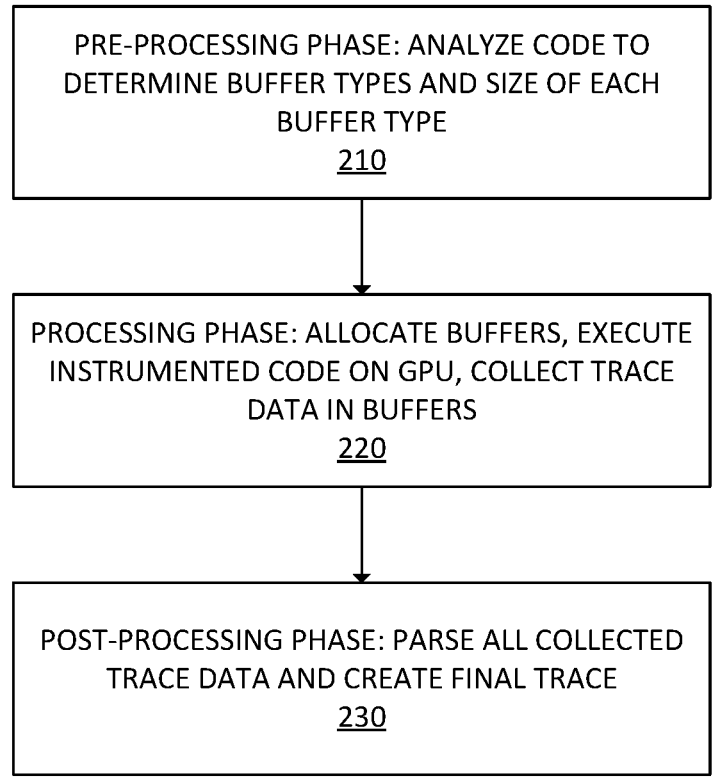
FIG. 2 illustrates an example of a first logic flow.

FIG. 2 illustrates an embodiment of a logic flow 200. The logic flow 200 may be representative of some or all of the operations executed by one or more embodiments described herein. For example, the logic flow 200 may reflect one or more processing phases implemented by various components of the system 100. Embodiments are not limited in this context.

At block 210, the instrumentation engine 106 may perform a preprocessing phase to analyze the instrumented binary code 107 to determine a number of trace buffers 108 required for the instrumented binary code 107, and a respective size of each of the determined trace buffers 108. For example, by analyzing the instrumented binary code 107, the instrumentation engine 106 may determine to generate a first trace buffer 108-1 for memory access traces, a second trace buffer 108-2 for instruction flow traces, a third trace buffer 108-3 for traces of single instruction multiple data (SIMD) active channels, and a fourth trace buffer 108-4 for register value traces. More generally, the instrumentation engine 106 may determine any number of trace buffers 108, where each trace buffer 108 has a respective size determined by the instrumentation engine 106, and each trace buffer 108 corresponds to a particular trace type generated by the instrumented binary code 107.

During the preprocessing phase, the instrumentation engine 106 may generally consider that the instrumented binary code 107 includes a plurality of basic blocks 1-M, where M is a positive integer. A basic block (also referred to as a block) may comprise one or more lines of assembly code that have a defined entry point and a defined exit point. The instrumentation engine 106 may therefore analyze the instrumented binary code 107 to identify a plurality of basic blocks therein. Furthermore, the instrumentation engine 106 may consider each of a plurality of different trace types 1-N, where N is a positive integer. Therefore, during the preprocessing phase analysis, the instrumentation engine 106 determines the number of records required for a single execution of each identified basic block 1-M for all trace types 1-N. Stated differently, the instrumentation engine 106 determines X(type, bbl), where "X" corresponds to the number of trace data records for each trace "type", where, for an execution of each basic block "bbl", where 1≤bbl≤M. For example, the instrumentation engine 106 may determine that a first basic block generates 5 trace data records of a first trace type and a second basic block generates 20 trace data records of the first trace type. Furthermore, the instrumentation engine 106 may determine the number of dynamic execution instances of each basic block in the instrumented binary code 107. Stated differently, the instrumentation engine 106 may determine a BBLCount(bbl), where 1≤bbl≤M. For example, by executing the instrumented binary code 107, the instrumentation engine 106 may determine that a first basic block has 10 dynamic execution instances, while a second basic block has 20 dynamic execution instances. Doing so may allow the instrumentation engine 106 to determine the required number of trace data records for each type, which may be referred to as Records(type), where 1≤type≤N. For example, the instrumentation engine 106 may determine Records(type) based on the following Equation 1:

$$\text{Records(type)} = \sum_{bbl=1}^{M} X(\text{type, bbl}) \times BBLCount(\text{bbl}).\qquad \text{Equation 1}$$

Therefore, by applying Equation 1, the instrumentation engine 106 may compute, for each record type, the corresponding number of records based on the static amount of records X(type,bbl) generated by each basic block multiplied by the number of execution instances BBLCount(bbl) of each basic block in the instrumented binary code 107. Therefore, continuing with the previous example, the instrumentation engine 106 may determine that 450 trace data records of the first trace type (e.g., 10×5+20×20) are required to trace the instrumented binary code 107.

Each record type may have a known size (e.g., in bytes), which may be referred to as RecordSize(type). Therefore, the instrumentation engine 106 may determine the size of each trace buffer 108 to be allocated in the shared memory 104, e.g., by multiplying the known size of each record type to the number of records generated of each type determined according to equation 1. Stated differently, for a given buffer 108, the size of the buffer may be computed based on: RecordSize(type)× Records(type), where 1≤type≤N. Therefore, continuing with the previous example, if a record of the first trace type is 10 bytes (e.g., the RecordSize=10 bytes), a buffer 108-1 for the first trace type may be 4,500 bytes in size (e.g., 450 records times 10 bytes). The instrumentation engine 106 may then allocate each buffer 108 in the memory 104.

Furthermore, in one embodiment, by executing an instance of the instrumented binary code 107, the instrumentation engine 106 may determine an execution flow of the instrumented binary code 107. As described in greater detail below, the instrumentation engine 106 may use the execution flow to generate the final trace 109 at block 230. For example, by identifying the flow between basic blocks (e.g., based on an identifier of each basic block), the instrumentation engine 106 may reassemble the data in each trace buffer 108 to generate the final trace 109.

Block 220 of logic flow 200 may comprise a processing phase. During the processing phase, the determined buffers 108 are allocated in the memory 104, the instrumented binary code 107 is executed by the plurality of execution units of the graphics processor 103, and trace data records of each type are stored in the corresponding trace buffers 108. For example, memory trace records may be stored in a memory trace buffer 108-1, control flow trace records may be stored in a control flow trace buffer 108-2, and so on. Examples related to the generation and storage of trace data are described in U.S. patent application Ser. No. 16/296,357 filed on Mar. 8, 2019, which is incorporated by reference herein in its entirety. More generally, records are stored in the trace buffer 108 in order (for a given hardware thread) when the instrumented binary code 107 is executed by the hardware threads of each processor core of the graphics processor 103. Doing so allows the instrumentation engine 106 to generate the final trace 109 based on the ordered execution flow reflected by the order of records in the trace buffers 108.

Block 230 may comprise a postprocessing phase. During the postprocessing phase, the instrumentation engine 106 may generate a final trace 109 based on the trace data stored in the buffers 108 during execution of the instrumented binary code 107. As stated, the instrumentation engine 106 may generate the final trace 109 by parsing the data in each trace buffer 108, analyzing the parsed data, and combining the data in each trace buffer 108 according to the execution flow of the instrumented binary code 107. As stated, the order of execution may be determined based on an execution instance of the instrumented binary code 107 during the preprocessing phase at block 210 and/or the processing phase of block 220.

The final trace 109 may be used for any purpose. For example, the final trace 109 may be provided as input to architecture and performance simulators, or used to replay the execution in the system 101 natively. As another example, instruction (or control-flow) traces may be used for nested binary loop detection and trip count calculation to improve compiler quality. As yet another example, memory (or address) traces can be used by performance analyzers for detection of memory patterns and providing suggestions for memory access changes in order to gain performance.

Figure 3:
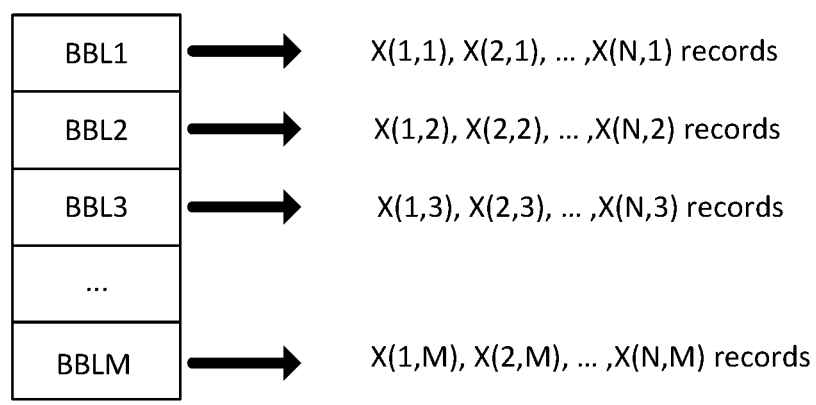
FIG. 3 illustrates an embodiment a preprocessing phase to generate different traces for graphics processor code.

FIG. 3 is a schematic 300 depicting an example of at least a portion of the preprocessing phase performed by the instrumentation engine 106. As stated, the instrumentation engine 106 may analyze the instrumented binary code 107 to identify one or more basic blocks (bbl) 1-M of the instrumented binary code 107. As part of the analysis, the instrumentation engine 106 determines, for each basic block 1-M, the number of trace data records of each type that need to be saved to the memory 104 in a single execution instance of the corresponding basic block. For example, a single execution instance of basic block M may generate 10 trace data records for a first trace type (e.g., a memory access trace), 5 trace data records for a second trace type (e.g., control flow trace), and so on.

Therefore, as shown in FIG. 2, the instrumentation engine 106 determines, for each basic block 1-M of the instrumented binary code 107, the amount of records X(type,bbl) generated of each type in a single execution instance of the corresponding basic block, where 1≤type≤N. In some embodiments, one or more of the basic blocks 1-M may not produce records of a given type, e.g., a basic block that does not include memory access instructions does not generate memory accessing trace data. For these basic blocks, X(type, bbl) may equal zero.

As stated, the instrumentation engine 106 may then analyze the instrumented binary code 107 to determine the dynamic frequencies (e.g., the number of executions) of each basic block, BBLcount(bbl). In one embodiment, the instrumentation engine 106 determines the dynamic frequency of each basic block by executing the instrumented binary code 107 and recording the number of executions of each basic block. The instrumentation engine 106 may then determine the number total number of required trace data records for each trace type by multiplying the amount of records X(type,bbl) by the dynamic frequency of each basic block BBLcount(bbl). Based on the record size for each trace data record type, the instrumentation engine 106 may determine the size of each trace buffer 108 and allocate the trace buffers 108 in the memory 104.

Figure 4A:
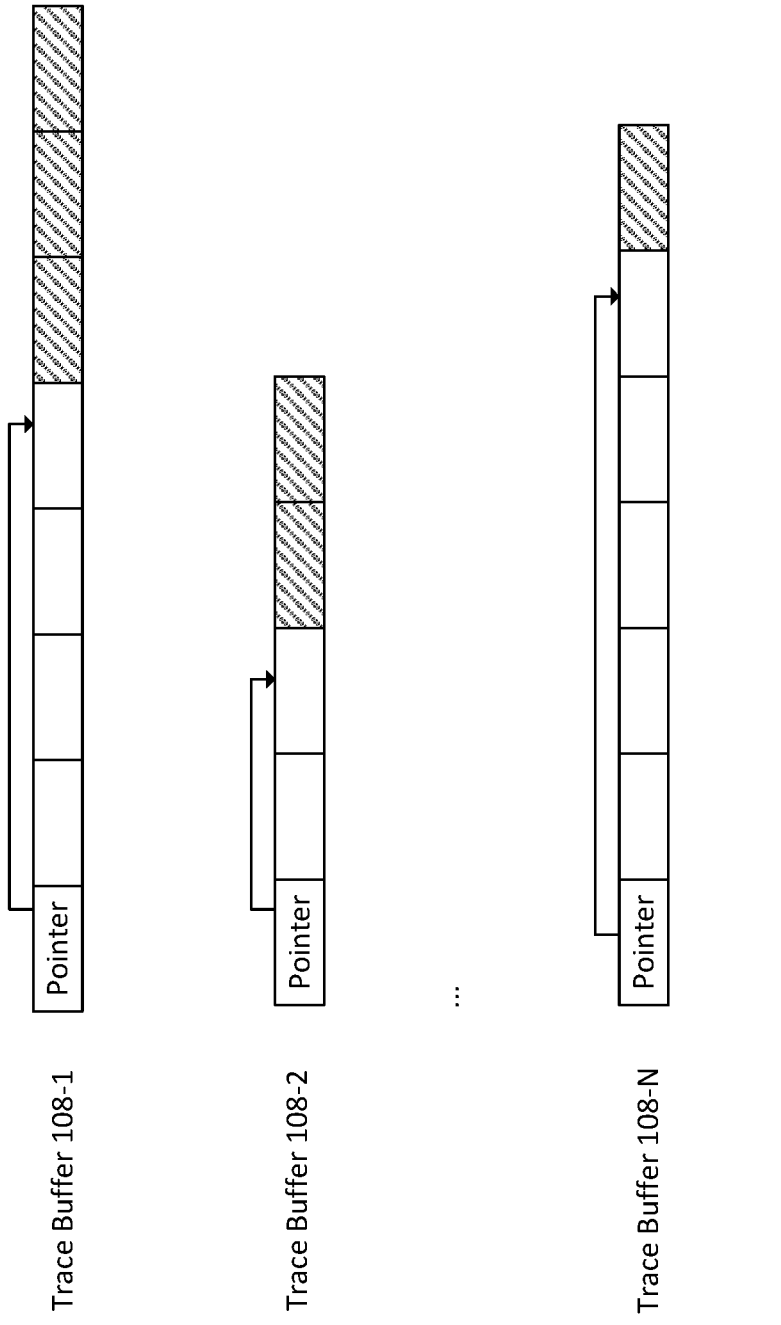
FIGS. 4A-4B illustrate embodiments of dynamic trace buffers used to collect data during a processing phase.

FIG. 4A is a schematic 400 illustrating example trace buffers 108-1 through 108-N, according to one embodiment. As stated, each trace buffer 108 may correspond to a specific trace type, also referred to as a subtrace. For example, trace buffer 108-1 may correspond to memory traces, trace buffer 108-2 may correspond to instruction flow traces, and trace buffer 108-N may correspond to control flow traces. During execution of the instrumented binary code 107, the graphics processor 103 may add trace data records to the trace buffers 108-1 through 108-N. Generally, the leftmost element (e.g., offset zero) of each trace buffer 108 stores a pointer, which points to the next available entry in the buffer 108 at any given time. The pointer value may be initialized (e.g., by the instrumentation engine 106 before the execution) to the value which equals ([(buffer total size)/(single record size)]−1) to point to the last (rightmost) element of the buffer 108. In the examples depicted in FIG. 4A, the shaded boxes correspond to entries of the 108 where trace data has been written. Therefore, the direction of growth of the buffers 108 begins on the right side of the buffers 108, moving toward the left.

When the instrumented binary code 107 executing on the graphics processor 103 attempts to write a trace data record to one of the buffers 108, the pointer value in the buffer 108 is referenced to identify where (e.g., a record, element, and/or entry in the buffer 108) the trace data record should be written to. The trace data record may then be atomically written to the portion of the buffer 108 pointed to by the pointer. Each trace data record may store a unique identifier of the basic block from which the record is saved, a hardware thread ID of the hardware thread executing the basic block of the instance of the instrumented binary code 107, and any additional data. For example, if trace buffer 108-1 is a memory access trace buffer, the memory address being accessed by the basic block may be written to a record in the buffer 108-1. Similarly, if trace buffer 108-2 is a control flow trace buffer, the basic block ID of the next basic block being executed may be written to the record in the buffer 108-2. Once the record is written to the trace buffer 108, the instrumented binary code 107 may atomically update the pointer, e.g., via an atomic subtraction operation, to cause the pointer to point to the next free record in the buffer 108. Doing so may prevent a conflict between several instances of the instrumented binary code 107 running concurrently on different hardware threads of the graphics processor 103 and saving the data within the same locations of the trace buffer 108. Instead, the multiple instances of the instrumented binary code 107 running concurrently on different hardware threads of the graphics processor 103 may advantageously save data to the buffers 108 without conflict. In such embodiments, to prevent conflicts, a given hardware thread may perform an atomic read of the pointer value and reserve the corresponding record (or multiple record) in the buffer 108 for storing trace data.

Figure 4B:
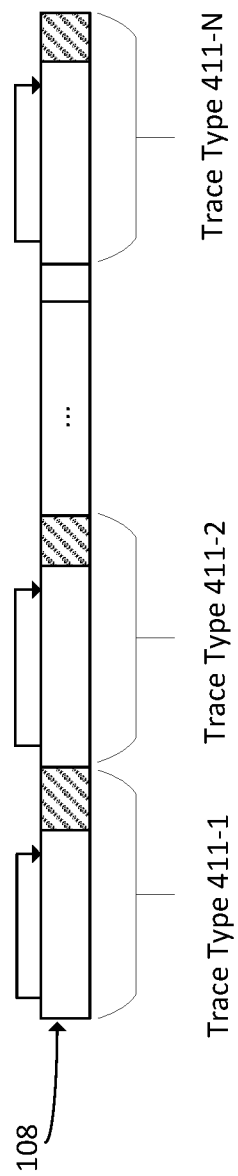

FIG. 4B is a schematic 410 illustrating an embodiment where a single trace buffer 108 is allocated in the memory 104. To allocate a single trace buffer 108, the instrumentation engine 106 may determine the total number of trace data records generated by executing each basic block and the number of execution instances of each basic block as described above. Based on the record size for each trace data record, the instrumentation engine 106 may compute the total size of the single trace buffer 108. The instrumentation engine 106 may then allocate and initialize the trace buffer 108. However, as shown, the single trace buffer 108 is divided into portions, where each portion is allocated to a particular trace type. For example, as shown, the buffer 108 is divided into portions 411-1 through 411-N for each trace type, where N is a positive integer. Each portion 411-1 through 411-N includes a pointer as described above with reference to FIG. 4A. Records may be written to the single buffer 108 by identifying the zeroth offset for the trace type and writing to the address pointed to by the pointer.

Figure 5:
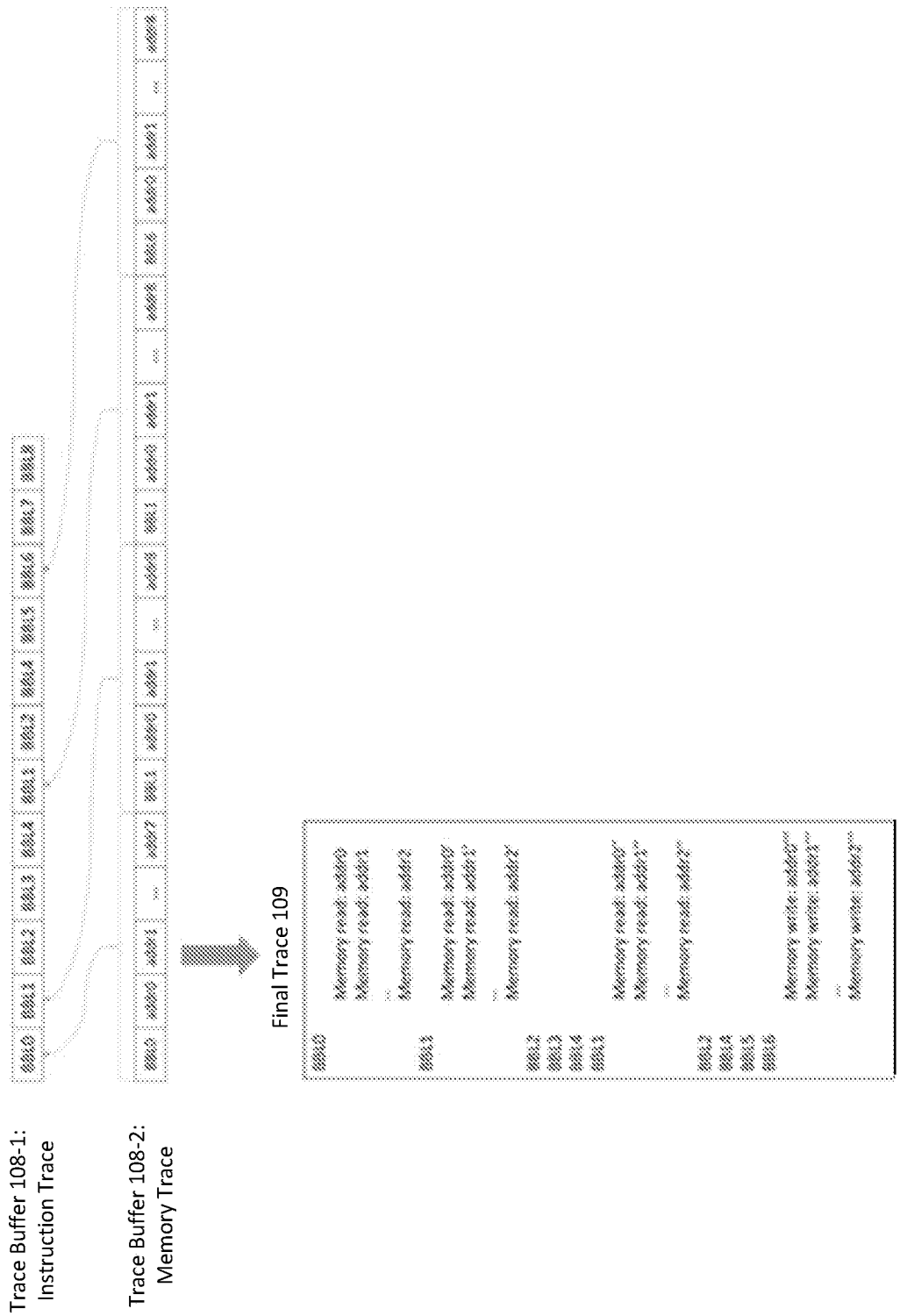
FIG. 5 illustrates an example of a post-processing phase to combine different traces for graphics processor code.

FIG. 5 is a schematic 500 illustrating an of the postprocessing phase performed by the instrumentation engine 106. As shown, the instrumentation engine 106 generates a final trace 109 based on two example trace buffers 108-1 and 108-2. As shown, trace buffer 108-1 is an instruction trace buffer, while trace buffer 108-2 is a memory trace buffer. Generally, during the postprocessing phase, the instrumentation engine 106 collects all data from each buffer 108 and combines the collected data to generate the final trace 109, e.g., based on the basic block IDs in each buffer 108. For example, by identifying the basic blocks IDs in the trace buffer 108-1, the instrumentation engine 106 may identify corresponding basic block IDs in the memory access buffer 108-2, which may specify which memory addresses were accessed by basic blocks in order. By combining the data associated with each basic block in the buffers 108-1, 108-2, the instrumentation engine 106 may generate the final trace 109, which reflects the control flow between each basic block and the memory addresses accessed by each basic block in execution. More generally, because the records in each trace buffer 108 are stored in order for a given hardware thread of the graphics processor 103, the instrumentation engine 106 may combine the data in each trace buffer 108 to reflect the order of each operation performed when executing the instrumented binary code 107 among multiple hardware threads of the graphics processor 103.

Figure 6:
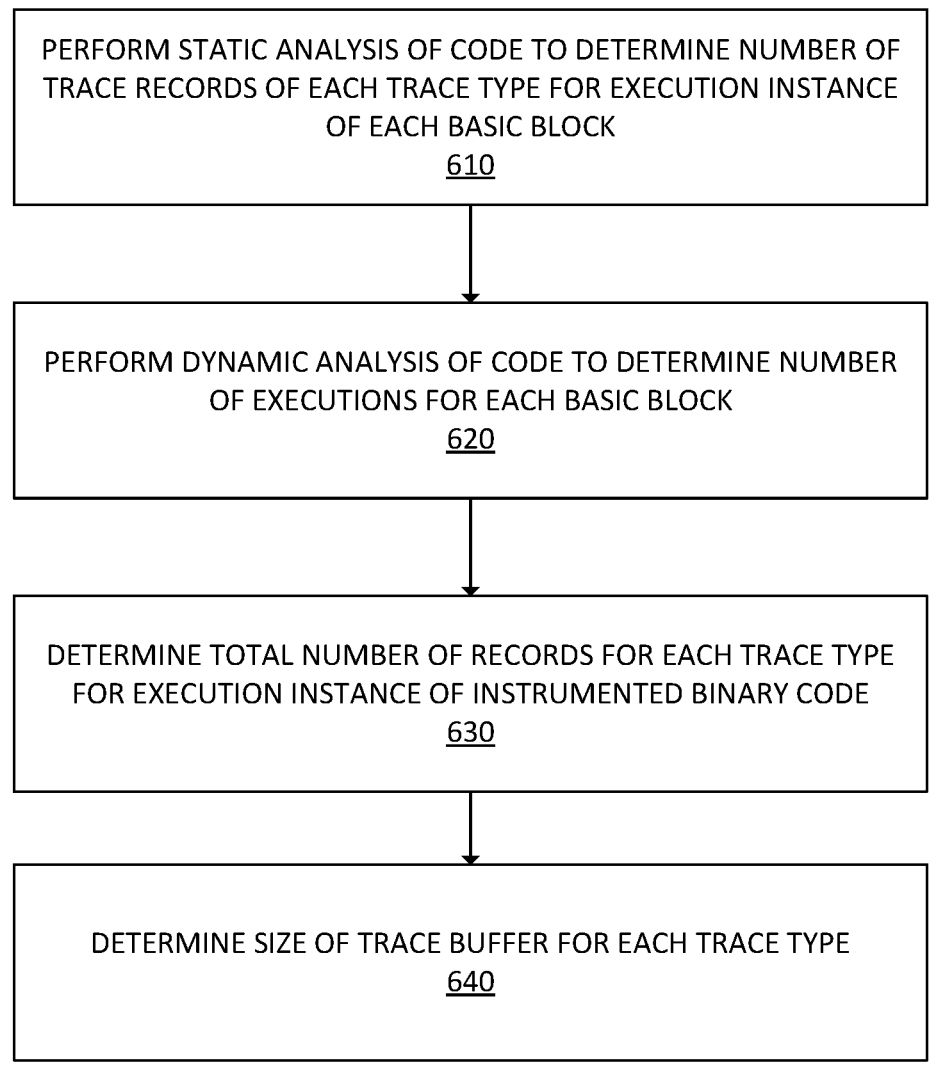
FIG. 6 illustrates an example of a second logic flow.

FIG. 6 illustrates an embodiment of a logic flow 600. The logic flow 600 may be representative of some or all of the operations executed by one or more embodiments described herein. For example, the logic flow 600 may represent some or all of the operations performed during the preprocessing phase. Embodiments are not limited in this context.

As shown, the logic flow 600 begins at block 610, where the instrumentation engine 106 may perform a static analysis of the instrumented binary code 107 to determine the number of trace data records of each trace type generated based on a single execution of each basic block of the instrumented binary code 107. Generally, at block 610, the instrumentation engine 106 may parse each statement of the instrumented binary code 107 to identify each basic block of the instrumented binary code 107 and any trace data generated by each basic block. For example, by identifying a given execution instance of each basic block in the instrumented binary code 107, the instrumentation engine 106 may determine the generated number of memory trace data records, instruction trace data records, and time stamp trace data records of each basic block. In one embodiment, the instrumentation engine 106 determines the generated number of each type of record based at least in part on identifying and analyzing the portions of the instrumented binary code 107 that generate trace data records. Doing so may allow the instrumentation engine 106 to determine different attributes of each trace data record, such as the type, size, and/or number of instances of each trace data record generated by executing each basic block of the instrumented binary code 107.

At block 620, the instrumentation engine 106 performs a dynamic analysis of the instrumented binary code 107 to determine the number of executions of each basic block. For example, the instrumentation engine 106 may initiate an execution instance of the instrumented binary code 107 on the graphics processor 103 to determine how many times each basic block is executed during the execution instance of the instrumented binary code 107. In such an example, the instrumented portion of the instrumented binary code 107 may maintain logs reflecting a count of execution instances of each basic block of the instrumented binary code 107. As another example, the instrumentation engine 106 may reference such logs to determine the count of the execution instances of each basic block of the instrumented binary code 107. Furthermore, based on the execution instance of the instrumented binary code 107 during the preprocessing phase, the instrumentation engine 106 may store a template reflecting the execution flow of the instrumented binary code 107, which may be used by the instrumentation engine 106 to generate the final trace 109 during the postprocessing phase.

At block 630, the instrumentation engine 106 may determine the total number of trace data records required for each trace type for a single execution instance of the instrumented binary code 107. For example, the instrumentation engine 106 may use the data generated at blocks 610-620 to determine, for each trace type, the total number of trace data records generated for a single execution instance of the instrumented binary code 107. In one embodiment, the instrumentation engine 106 may apply Equation 1 at block 630. More generally, the instrumentation engine 106 may, for each trace type, multiply the number of trace data records generated by each basic block determined at block 610 by the total number of execution instances of each basic block determined at block 620, and compute a sum of each product. For example, if a first basic block generates 10 memory trace records, 2 instruction trace records, and zero control flow records, and the first basic block is executed 20 times, the instrumentation engine 106 may determine that executing the instrumented binary code 107 may produce 200 memory trace records, 40 instruction trace records, and zero control flow records. The instrumentation engine 106 may then perform these operations for each other basic block of the instrumented binary code 107 to determine the total number of records for each trace type.

At block 640, the instrumentation engine 106 may determine the size of each trace buffer 108 for each trace type. For example, the instrumentation engine 106 may determine the size of each trace data record type, e.g., based on the analysis performed at block 610 and/or a log reflecting the known sizes of each trace data record type. Based on the size of each trace data record type and the total number of trace data records generated by an execution instance of the instrumented binary code 107 determined at block 630, the instrumentation engine 106 may determine the size of each trace data buffer 108. For example, if an execution instance of the instrumented binary code 107 generates 2,000 control flow trace data records, and each control flow trace data record is 10 bytes, the instrumentation engine 106 may determine a size of 20,000 bytes for the trace buffer 108 for the control flow trace data. Therefore, when a subsequent execution instance of the instrumented binary code 107 occurs, the instrumentation engine 106 may allocate a 20,000 byte trace buffer 108 in the shared memory 104 for control flow trace data (as well as buffers 108 for other trace data types).

Figure 7:
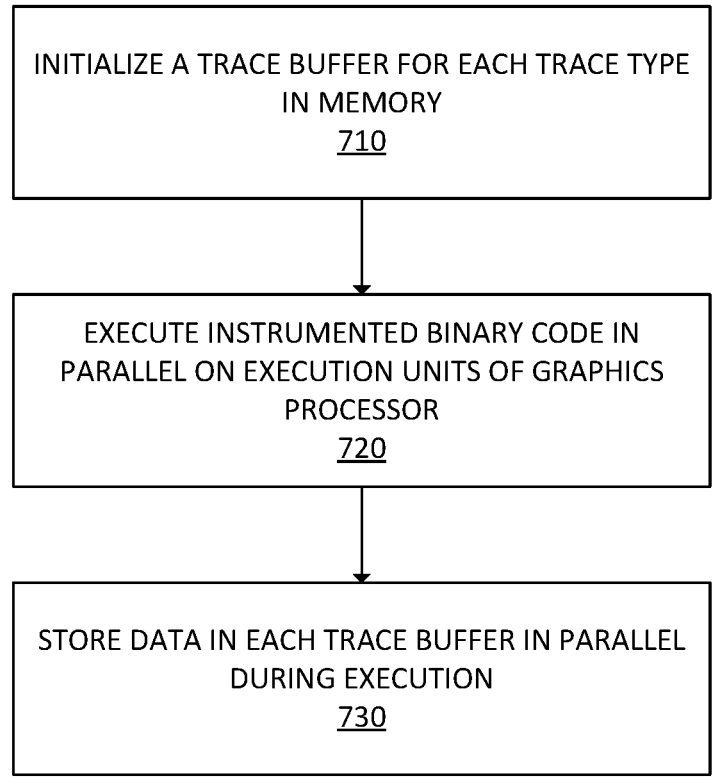
FIG. 7 illustrates an example of a third logic flow.

FIG. 7 illustrates an embodiment of a logic flow 700. The logic flow 700 may be representative of some or all of the operations executed by one or more embodiments described herein. Embodiments are not limited in this context.

As shown, the logic flow 700 begins at block 710, where the instrumentation engine 106 may initialize a trace buffer 108 for each trace data type in the memory 104. Generally, the instrumentation engine 106 may determine the size of each trace buffer 108 during the preprocessing phase. Therefore, when an execution instance of the instrumented binary code 107 is scheduled and/or initiated, the trace buffers 108 may be allocated and/or initialized in the memory 104. As stated, in one embodiment, the trace buffer 108 may be a single buffer and/or multiple buffers. At block 720, the instrumented binary code 107 is executed on a plurality of hardware threads of a plurality of execution units (e.g., cores) of the graphics processor 103 in parallel. Doing so may cause the instrumented binary code 107 to generate trace data records. At block 730, the trace data records generated during execution of the instrumented binary code 107 is stored to the corresponding trace buffer 108. For example, memory access trace data records may be written to a memory access trace buffer 108-1, while control flow trace data records may be written to a control flow trace buffer 108-2. As stated, a basic block ID, hardware thread ID, and data may be stored in each record in the trace buffers 108.

Figure 8:
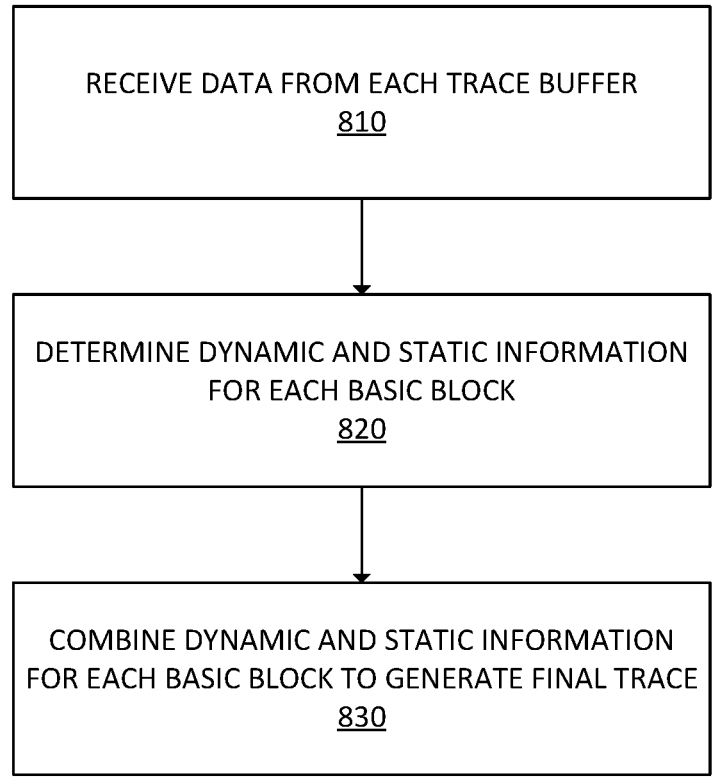
FIG. 8 illustrates an example of a fourth logic flow.

FIG. 8 illustrates an embodiment of a logic flow 800. The logic flow 800 may be representative of some or all of the operations executed by one or more embodiments described herein. For example, the logic flow 800 may be representative of some or all of the operations executed to generate the final trace 109. Embodiments are not limited in this context.

As shown, the logic flow 800 begins at block 810, where the instrumentation engine 106 executing on the CPU 102 may receive the trace data records stored in the trace buffers 108 during the execution of the instrumented binary code 107 during the processing phase. At block 820, the instrumentation engine 106 executing on the CPU 102 determines information for each basic block of the instrumented binary code 107, e.g., information gathered during the preprocessing phase. For example, the instrumentation engine 106 may determine the static information for each basic block (e.g., what instructions are executed, what trace data is generated, etc.) and the dynamic information for each basic block (e.g., the number of execution instances, the order of execution of each basic block, etc.). At block 830, the instrumentation engine 106 executing on the CPU 102 may combine the data from all trace buffers 108 to generate the final trace 109, e.g., based on the execution flow determined during the preprocessing phase and the basic block IDs in each record in the trace buffers 108. For example, by filtering the records in each buffer based on hardware thread ID, and combining records based on basic block IDs in each buffer 108, the instrumentation engine 106 may generate the final trace 109. More generally, because the records in each trace buffer 108 generated by a given hardware thread are stored in order of execution, the instrumentation engine 106 may combine the records in each trace buffer 108 to generate the final trace 109.

Figure 9:
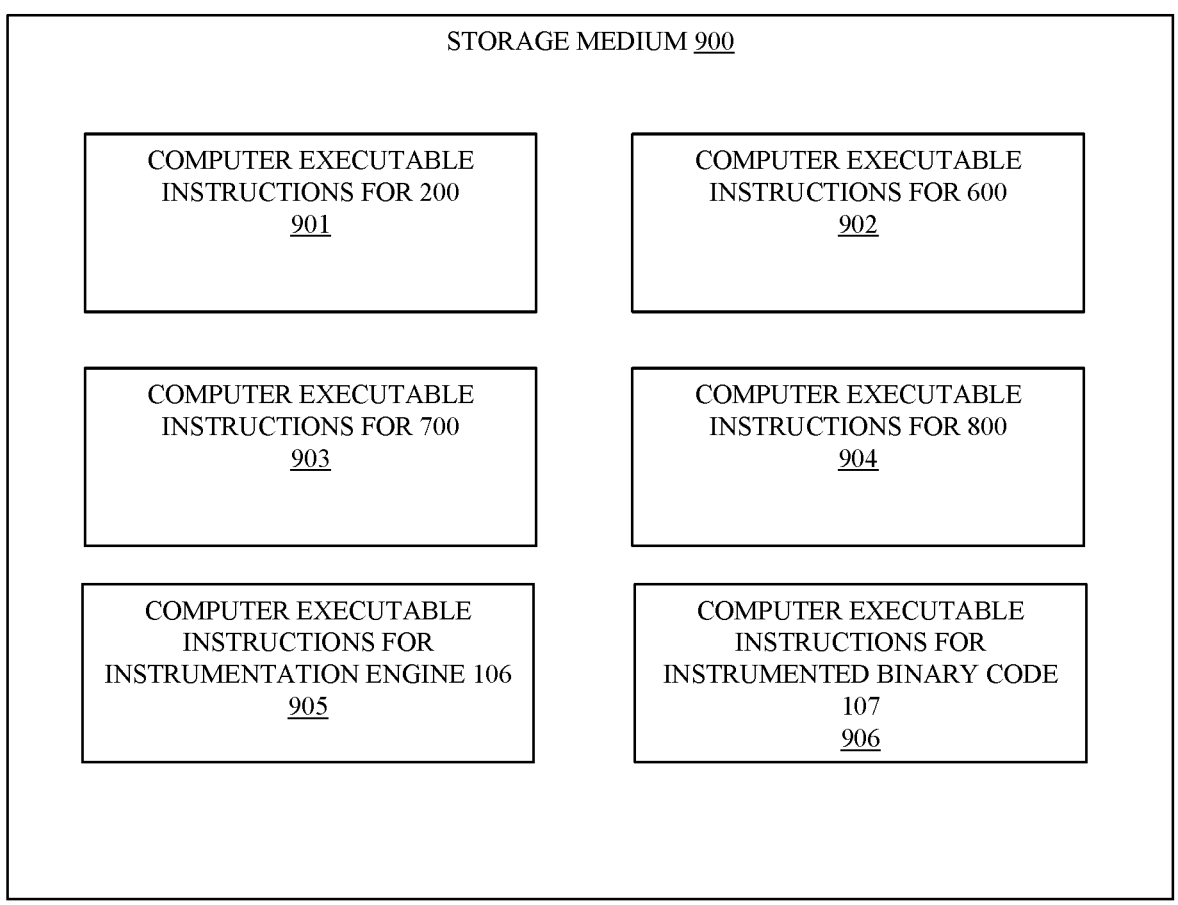
FIG. 9 illustrates an embodiment of a storage medium.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flows or operations described herein, such as instructions 901, 902, 903, 904 for logic flows 200, 600, 700, and 800 of FIGS. 2, 6, 7, and 8 respectively. Similarly, the storage medium 900 may store computer-executable instructions 905 for the instrumentation engine 106. The storage medium 900 may further store computer-executable instructions 906 for the instrumented binary code 107. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
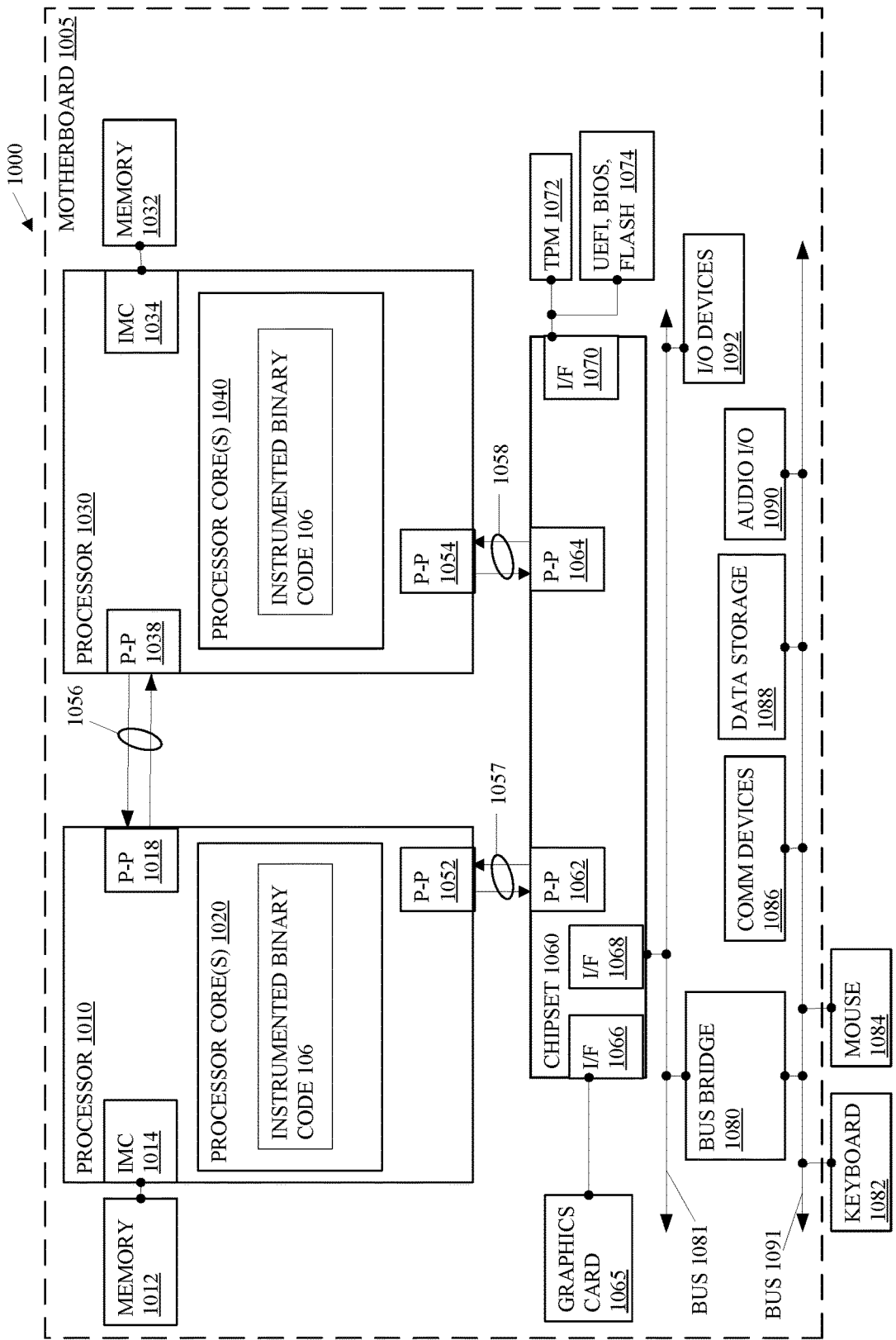
FIG. 10 illustrates an embodiment of a system.

FIG. 10 illustrates an example system 1000. The system 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments are implemented as, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores.

As shown, system 1000 comprises a motherboard 1005 for mounting platform components. The motherboard 1005 is a point-to-point interconnect platform that includes a first processor 1010 and a second processor 1030 coupled via a point-to-point interconnect 1056 such as an Ultra Path Interconnect (UPI). In other embodiments, the system 1000 may be of another bus architecture, such as a multi-drop bus. Furthermore, each of processors 1010 and 1030 may be processor packages with multiple processor cores including processor core(s) 1020 and 1040, respectively. The processors 1010 and 1030 are representative of the CPU 102 and/or the graphics processor 103 of FIG. 1. Similarly, the cores 1020 and 1040 may be representative of cores (or execution units) of the graphics processor 103, where each core 1020, 1040 has a plurality of hardware threads that may execute at least a portion of the instrumented binary code 107 and store trace data to the trace buffers 108 allocated by the instrumentation engine 106. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may be associated with a socket identifier. Note that the term platform refers to the motherboard with certain components mounted such as the processors 1010 and the chipset 1060. Some platforms may include additional components and some platforms may only include sockets to mount the processors and/or the chipset.

The first processor 1010 includes an integrated memory controller (IMC) 1014 and point-to-point (P-P) interfaces 1018 and 1052. Similarly, the second processor 1030 includes an IMC 1034 and P-P interfaces 1038 and 1054. The IMC's 1014 and 1034 couple the processors 1010 and 1030, respectively, to respective memories, a memory 1012 and a memory 1032. The memories 1012 and 1032 may be portions of the main memory (e.g., a dynamic random access memory (DRAM)) for the platform such as double data rate type 3 (DDR3) or type 4 (DDR4) synchronous DRAM (SDRAM). In the present embodiment, the memories 1012 and 1032 are locally attached to the respective processors 1010 and 1030. In other embodiments, the main memory may couple with the processors via a bus and shared memory hub.

The first processor 1010 couples to a chipset 1060 via P-P interconnects 1052 and 1062 and the second processor 1030 couples to a chipset 1060 via P-P interconnects 1054 and 1064. Direct Media Interfaces (DMIs) 1057 and 1058 may couple the P-P interconnects 1052 and 1062 and the P-P interconnects 1054 and 1064, respectively. The DMI may be a high-speed interconnect that facilitates, e.g., eight Giga Transfers per second (GT/s) such as DMI 3.0. In other embodiments, the processors 1010 and 1030 may interconnect via a bus.

The chipset 1060 may comprise a controller hub such as a platform controller hub (PCH). The chipset 1060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1060 may comprise more than one controller hub such as a chipset with a memory controller hub, a graphics controller hub, and an input/output (I/O) controller hub.

In the present embodiment, the chipset 1060 couples with a trusted platform module (TPM) 1072 and the UEFI, BIOS, Flash component 1074 via an interface (I/F) 1070. The TPM 1072 is a dedicated microcontroller designed to secure hardware by integrating cryptographic keys into devices. The UEFI, BIOS, Flash component 1074 may provide pre-boot code.

In some embodiments, chipset 1060 includes an interface (I/F) 1066 to couple chipset 1060 with a high-performance graphics engine, graphics card 1065. The I/F 1066 may be, for example, a Peripheral Component Interconnect-enhanced (PCI-e). In such an example, the graphics card 1065 may comprise one or more processors 1010, 1030 and corresponding processor cores to process the instrumented binary code 107. In some embodiments, the system 1000 may include a flexible display interface (FDI) between the processors 1010 and 1030 and the chipset 1060. The FDI interconnects a graphics processor core in a processor with the chipset 1060.

Various I/O devices 1092 couple to the bus 1081, along with a bus bridge 1080 which couples the bus 1081 to a second bus 1091 and an I/F 1068 that connects the bus 1081 with the chipset 1060. In one embodiment, the second bus 1091 may be a low pin count (LPC) bus. Various devices may couple to the second bus 1091 including, for example, a keyboard 1082, a mouse 1084, communication devices 1086 and a data storage unit 1088 that may store code such as the instrumented binary code 107. Furthermore, an audio I/O 1090 may couple to second bus 1091. Many of the I/O devices 1092, communication devices 1086, and the data storage unit 1088 may reside on the motherboard 1005 while the keyboard 1082 and the mouse 1084 may be add-on peripherals. In other embodiments, some or all the I/O devices 1092, communication devices 1086, and the data storage unit 1088 are add-on peripherals and do not reside on the motherboard 1005.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

The following examples pertain to further embodiments, from which numerous permutations and configurations will be apparent.

Example 1 is an apparatus, comprising: a processor; a graphics processor; and memory coupled to the processor and the graphics processor, the memory storing instructions which when executed by the processor cause the processor to: determine a count of trace records to be generated by each block of a plurality of blocks of an instrumented binary code to be executed on the graphics processor, each trace record to comprise a trace record type, the trace record types of a plurality of trace record types; determine a respective execution count for each of the plurality of blocks of the instrumented binary code to be executed on the graphics processor; and determine a respective size of each of a plurality of trace buffers to be allocated in the memory based on the determined counts of trace records generated by each block and the execution count for each block, each trace buffer to store trace records of a respective one of the plurality of trace record types.

Example 2 includes the subject matter of example 1, the memory storing instructions which when executed by the processor cause the processor to: determine a respective size of each trace record type of the plurality of trace record types; and determine the respective size of each of the plurality of trace buffers to be allocated in the memory based on the respective size of each trace record type, the respective count of trace records generated by each block, and the execution count for each block.

Example 3 includes the subject matter of example 1, the count of trace records generated by each block to be determined based on an analysis of the instrumented binary code, the execution count for each of the plurality of blocks to be determined based on a first execution instance of the instrumented binary code on the graphics processor, one of the processor or the graphics processor to allocate and initialize the plurality of trace buffers in the memory.

Example 4 includes the subject matter of example 3, the memory storing instructions which when executed by the processor cause a second execution instance of the instrumented binary code to be performed in parallel by a plurality of execution threads of a plurality of processor cores of the graphics processor.

Example 5 includes the subject matter of example 4, the second execution instance of the instrumented binary code to generate trace data records to be stored in the trace buffers based on the type of each trace data record.

Example 6 includes the subject matter of example 5, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

Example 7 includes the subject matter of example 6, the memory storing instructions which when executed by the processor cause the processor to: parse the trace data records stored in each of the plurality of trace buffers; and combine the parsed trace data records based at least in part on the identifiers of the blocks of the instrumented binary code to generate a final trace for the instrumented binary code.

Example 8 includes the subject matter of example 1, the plurality of trace buffers to comprise one of a single trace buffer or a plurality of separate trace buffers, the instrumented binary code to comprise assembly code, each block to comprise at least one line of the assembly code.

Example 9 includes the subject matter of example 1, the memory storing instructions which when executed by the processor cause the processor to: determine a respective size of each trace record type; compute, for each trace record type, a total count of trace records of the trace record type based on a sum of the trace records to be generated by the plurality of blocks of the instrumented binary code; and determine the size of each trace buffer based on a product of the respective total count of trace records of the trace record type and the respective size of each trace record type.

Example 10 is a non-transitory computer-readable storage medium storing instructions which when executed by a processor cause the processor to: determine a count of trace records to be generated by each block of a plurality of blocks of an instrumented binary code to be executed on a graphics processor, each trace record to comprise a trace record type, the trace record types of a plurality of trace record types; determine a respective execution count for each of the plurality of blocks of the instrumented binary code to be executed on the graphics processor; and determine a respective size of each of a plurality of trace buffers to be allocated in a memory shared by the processor and the graphics processor based on the determined counts of trace records generated by each block and the execution count for each block, each trace buffer to store trace records of a respective one of the plurality of trace record types.

Example 11 includes the subject matter of example 10, storing instructions which when executed by the processor cause the processor to: determine a respective size of each trace record type of the plurality of trace record types; and determine the respective size of each of the plurality of trace buffers to be allocated in the memory based on the respective size of each trace record type, the respective count of trace records generated by each block, and the execution count for each block.

Example 12 includes the subject matter of example 10, the count of trace records generated by each block to be determined based on an analysis of the instrumented binary code, the execution count for each of the plurality of blocks to be determined based on a first execution instance of the instrumented binary code on the graphics processor, one of the processor or the graphics processor to allocate and initialize the plurality of trace buffers in the memory.

Example 13 includes the subject matter of example 12, storing instructions which when executed by the processor cause a second execution instance of the instrumented binary code to be performed in parallel by a plurality of execution threads of a plurality of processor cores of the graphics processor.

Example 14 includes the subject matter of example 13, the second execution instance of the instrumented binary code to generate trace data records to be stored in the trace buffers based on the type of each trace data record.

Example 15 includes the subject matter of example 14, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

Example 16 includes the subject matter of example 14, storing instructions which when executed by the processor circuit cause the processor circuit to: parse the trace data records stored in each of the plurality of trace buffers; and combine the parsed trace data records based at least in part on the identifiers of the blocks of the instrumented binary code to generate a final trace for the instrumented binary code.

Example 17 includes the subject matter of example 10, the plurality of trace buffers to comprise one of a single trace buffer or a plurality of separate trace buffers, the instrumented binary code to comprise assembly code, each block to comprise at least one line of the assembly code.

Example 18 includes the subject matter of example 10, storing instructions which when executed by the processor circuit cause the processor circuit to: determine a respective size of each trace record type; compute, for each trace record type, a total count of trace records of the trace record type based on a sum of the trace records to be generated by the plurality of blocks of the instrumented binary code; and determine the size of each trace buffer based on a product of the respective total count of trace records of the trace record type and the respective size of each trace record type.

Example 19 is a method, comprising: determining, by a processor, a count of trace records to be generated by each block of a plurality of blocks of an instrumented binary code to be executed on a graphics processor, each trace record to comprise a trace record type, the trace record types of a plurality of trace record types; determining a respective execution count for each of the plurality of blocks of the instrumented binary code to be executed on the graphics processor; and determining a respective size of each of a plurality of trace buffers to be allocated in a memory shared by the processor and the graphics processor based on the determined counts of trace records generated by each block and the execution count for each block, each trace buffer to store trace records of a respective one of the plurality of trace record types.

Example 20 includes the subject matter of example 19, further comprising: determining a respective size of each trace record type of the plurality of trace record types; and determining the respective size of each of the plurality of trace buffers to be allocated in the memory based on the respective size of each trace record type, the respective count of trace records generated by each block, and the execution count for each block.

Example 21 includes the subject matter of example 19, the count of trace records generated by each block to be determined based on an analysis of the instrumented binary code, the execution count for each of the plurality of blocks to be determined based on a first execution instance of the instrumented binary code on the graphics processor.

Example 22 includes the subject matter of example 21, further comprising: allocating and initializing the plurality of trace buffers in the memory prior to causing a second execution instance of the instrumented binary code to be performed in parallel by a plurality of execution threads of a plurality of processor cores of the graphics processor, one of the processor or the graphics processor to allocate and initialize the plurality of trace buffers in the memory.

Example 23 includes the subject matter of example 22, the second execution instance of the instrumented binary code to generate trace data records to be stored in the trace buffers based on the type of each trace data record.

Example 24 includes the subject matter of example 23, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

Example 25 includes the subject matter of example 24, further comprising: parsing the trace data records stored in each of the plurality of trace buffers; and combining the parsed trace data records based at least in part on the identifiers of the blocks of the instrumented binary code to generate a final trace for the instrumented binary code.

Example 26 includes the subject matter of example 19, the plurality of trace buffers to comprise one of a single trace buffer or a plurality of separate trace buffers, the instrumented binary code to comprise assembly code, each block to comprise at least one line of the assembly code.

Example 27 includes the subject matter of example 19, further comprising: determining a respective size of each trace record type; computing, for each trace record type, a total count of trace records of the trace record type based on a sum of the trace records to be generated by the plurality of blocks of the instrumented binary code; and determining the size of each trace buffer based on a product of the respective total count of trace records of the trace record type and the respective size of each trace record type.

Example 28 is an apparatus, comprising: means for determining a count of trace records to be generated by each block of a plurality of blocks of an instrumented binary code to be executed on a graphics processor, each trace record to comprise a trace record type, the trace record types of a plurality of trace record types; means for determining a respective execution count for each of the plurality of blocks of the instrumented binary code to be executed on the graphics processor; and means for determining a respective size of each of a plurality of trace buffers to be allocated in a memory shared by the processor and the graphics processor based on the determined counts of trace records generated by each block and the execution count for each block, each trace buffer to store trace records of a respective one of the plurality of trace record types.

Example 29 includes the subject matter of example 28, further comprising: means for determining a respective size of each trace record type of the plurality of trace record types; and means for determining the respective size of each of the plurality of trace buffers to be allocated in the memory based on the respective size of each trace record type, the respective count of trace records generated by each block, and the execution count for each block.

Example 30 includes the subject matter of example 28, the count of trace records generated by each block to be determined based on an analysis of the instrumented binary code, the execution count for each of the plurality of blocks to be determined based on a first execution instance of the instrumented binary code on the graphics processor.

Example 31 includes the subject matter of example 30, further comprising: means for allocating and initializing the plurality of trace buffers in the memory prior to causing a second execution instance of the instrumented binary code to be performed in parallel by a plurality of execution threads of a plurality of processor cores of the graphics processor, one of the processor or the graphics processor to allocate and initialize the plurality of trace buffers in the memory.

Example 32 includes the subject matter of example 31, the second execution instance of the instrumented binary code to generate trace data records to be stored in the trace buffers based on the type of each trace data record.

Example 33 includes the subject matter of example 32, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

Example 34 includes the subject matter of example 33, further comprising: means for parsing the trace data records stored in each of the plurality of trace buffers; and means for combining the parsed trace data records based at least in part on the identifiers of the blocks of the instrumented binary code to generate a final trace for the instrumented binary code.

Example 35 includes the subject matter of example 28, the plurality of trace buffers to comprise one of a single trace buffer or a plurality of separate trace buffers, the instrumented binary code to comprise assembly code, each block to comprise at least one line of the assembly code.

Example 36 includes the subject matter of example 28, further comprising: means for determining a respective size of each trace record type; means for computing, for each trace record type, a total count of trace records of the trace record type based on a sum of the trace records to be generated by the plurality of blocks of the instrumented binary code; and means for determining the size of each trace buffer based on a product of the respective total count of trace records of the trace record type and the respective size of each trace record type.

In addition, in the foregoing, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus, comprising:
   a processor;
   a graphics processor; and
   memory coupled to the processor and the graphics processor, the memory storing instructions which when executed by the processor cause the processor to:
      determine a count of trace records to be generated by each block of a plurality of blocks of an instrumented binary code to be executed on the graphics processor, each trace record to comprise a trace record type, the trace record types of a plurality of trace record types, the plurality of trace record types corresponding to different types of traces;
      determine a respective execution count for each of the plurality of blocks of the instrumented binary code to be executed on the graphics processor; and
      determine a respective size of each of a plurality of trace buffers to be allocated in the memory based on the determined counts of trace records generated by each block and the execution count for each block, each trace buffer to store trace records of a respective one of the plurality of trace record types, the different types of traces to include two or more of a memory access trace, an instruction flow trace, a single instruction multiple data (SIMD) trace or a register value trace.

2. The apparatus of claim 1, the memory storing instructions which when executed by the processor cause the processor to:
   determine a respective size of each trace record type of the plurality of trace record types; and
   determine the respective size of each of the plurality of trace buffers to be allocated in the memory based on the respective size of each trace record type, the respective count of trace records generated by each block, and the execution count for each block.

3. The apparatus of claim 1, the count of trace records generated by each block to be determined based on an analysis of the instrumented binary code, the execution count for each of the plurality of blocks to be determined based on a first execution instance of the instrumented binary code on the graphics processor, one of the processor or the graphics processor to allocate and initialize the plurality of trace buffers in the memory.

4. The apparatus of claim 3, the memory storing instructions which when executed by the processor cause a second execution instance of the instrumented binary code to be performed in parallel by a plurality of execution threads of a plurality of processor cores of the graphics processor.

5. The apparatus of claim 4, the second execution instance of the instrumented binary code to generate trace data records to be stored in the trace buffers based on the type of each trace data record.

6. The apparatus of claim 5, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

7. The apparatus of claim 6, the memory storing instructions which when executed by the processor cause the processor to:
parse the trace data records stored in each of the plurality of trace buffers; and
combine the parsed trace data records based at least in part on the identifiers of the blocks of the instrumented binary code to generate a final trace for the instrumented binary code.

8. The apparatus of claim 1, the plurality of trace buffers to comprise one of a single trace buffer or a plurality of separate trace buffers, the instrumented binary code to comprise assembly code, each block to comprise at least one line of the assembly code.

9. A non-transitory computer-readable storage medium storing instructions which when executed by a processor cause the processor to:
determine a count of trace records to be generated by each block of a plurality of blocks of an instrumented binary code to be executed on a graphics processor, each trace record to comprise a trace record type, the trace record types of a plurality of trace record types, the plurality of trace record types corresponding to different types of traces;
determine a respective execution count for each of the plurality of blocks of the instrumented binary code to be executed on the graphics processor; and
determine a respective size of each of a plurality of trace buffers to be allocated in a memory shared by the processor and the graphics processor based on the determined counts of trace records generated by each block and the execution count for each block, each trace buffer to store trace records of a respective one of the plurality of trace record types, the different types of traces to include two or more of a memory access trace, an instruction flow trace, a single instruction multiple data (SIMD) trace or a register value trace.

10. The computer-readable storage medium of claim 9, storing instructions which when executed by the processor cause the processor to:
determine a respective size of each trace record type of the plurality of trace record types; and
determine the respective size of each of the plurality of trace buffers to be allocated in the memory based on the respective size of each trace record type, the respective count of trace records generated by each block, and the execution count for each block.

11. The computer-readable storage medium of claim 9, the count of trace records generated by each block to be determined based on an analysis of the instrumented binary code, the execution count for each of the plurality of blocks to be determined based on a first execution instance of the instrumented binary code on the graphics processor, one of the processor or the graphics processor to allocate and initialize the plurality of trace buffers in the memory.

12. The computer-readable storage medium of claim 11, storing instructions which when executed by the processor cause a second execution instance of the instrumented binary code to be performed in parallel by a plurality of execution threads of a plurality of processor cores of the graphics processor.

13. The computer-readable storage medium of claim 12, the second execution instance of the instrumented binary code to generate trace data records to be stored in the trace buffers based on the type of each trace data record, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

14. The computer-readable storage medium of claim 13, storing instructions which when executed by the processor cause the processor to:
parse the trace data records stored in each of the plurality of trace buffers; and
combine the parsed trace data records based at least in part on the identifiers of the blocks of the instrumented binary code to generate a final trace for the instrumented binary code.

15. The computer-readable storage medium of claim 9, the plurality of trace buffers to comprise one of a single trace buffer or a plurality of separate trace buffers, the instrumented binary code to comprise assembly code, each block to comprise at least one line of the assembly code.

16. A method, comprising:
determining, by a processor, a count of trace records to be generated by each block of a plurality of blocks of an instrumented binary code to be executed on a graphics processor, each trace record to comprise a trace record type, the trace record types of a plurality of trace record types, the plurality of trace record types corresponding to different types of traces;
determining a respective execution count for each of the plurality of blocks of the instrumented binary code to be executed on the graphics processor; and
determining a respective size of each of a plurality of trace buffers to be allocated in a memory shared by the processor and the graphics processor based on the determined counts of trace records generated by each block and the execution count for each block, each trace buffer to store trace records of a respective one of the plurality of trace record types, the different types of traces to include two or more of a memory access trace, an instruction flow trace, a single instruction multiple data (SIMD) trace or a register value trace.

17. The method of claim 16, further comprising:
determining a respective size of each trace record type of the plurality of trace record types; and
determining the respective size of each of the plurality of trace buffers to be allocated in the memory based on the respective size of each trace record type, the respective count of trace records generated by each block, and the execution count for each block.

18. The method of claim 16, the count of trace records generated by each block to be determined based on an analysis of the instrumented binary code, the execution count for each of the plurality of blocks to be determined based on a first execution instance of the instrumented binary code on the graphics processor, the method further comprising:
allocating and initializing the plurality of trace buffers in the memory prior to causing a second execution instance of the instrumented binary code to be performed in parallel by a plurality of execution threads of a plurality of processor cores of the graphics processor, one of the processor or the graphics processor to allocate and initialize the plurality of trace buffers in the memory.

19. The method of claim 18, the second execution instance of the instrumented binary code to generate trace data records to be stored in the trace buffers based on the type of each trace data record, the trace data records to comprise an identifier of the respective execution thread, an identifier of the respective block of the instrumented binary code, and trace data, each trace buffer to comprise a pointer to a next available element of the respective trace buffer during the second execution instance of the instrumented binary code.

20. The method of claim 19, further comprising:
parsing the trace data records stored in each of the plurality of trace buffers by the processor; and
combining, by the processor, the parsed trace data records based at least in part on the identifiers of the blocks of the instrumented binary code to generate a final trace for the instrumented binary code.

* * * * *